United States Patent
Soliman et al.

(10) Patent No.: US 8,070,648 B2
(45) Date of Patent: Dec. 6, 2011

(54) TRANSMISSION CLUTCH STROKING CONTROL DURING AN ENGINE RESTART IN A HYBRID ELECTRIC VEHICLE

(75) Inventors: Ihab S. Soliman, Canton, MI (US); Ryan A. McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 446 days.

(21) Appl. No.: 12/473,326

(22) Filed: May 28, 2009

(65) Prior Publication Data

US 2010/0304926 A1   Dec. 2, 2010

(51) Int. Cl.
*B60K 1/02* (2006.01)
*B60W 10/00* (2006.01)

(52) U.S. Cl. .............................. 477/3; 477/92
(58) Field of Classification Search ........................ None
See application file for complete search history.

(56) References Cited

U.S. PATENT DOCUMENTS

| 5,580,332 | A | 12/1996 | Mitchell et al. |
| 6,736,755 | B2* | 5/2004 | Kato ............................... 477/92 |
| 7,314,128 | B2 | 1/2008 | Gunderson et al. |
| 7,322,903 | B2 | 1/2008 | Ortmann et al. |
| 2006/0189436 | A1 | 8/2006 | Nakashima et al. |
| 2009/0024265 | A1 | 1/2009 | Kortschak et al. |
| 2010/0279816 | A1* | 11/2010 | Soliman ............................ 477/3 |
| 2011/0070999 | A1* | 3/2011 | Soliman et al. ..................... 477/3 |
| 2011/0071001 | A1* | 3/2011 | Yu et al. ........................ 477/203 |

FOREIGN PATENT DOCUMENTS

KR   20080053819 A   6/2008
WO   WO2006124011 A2   11/2006

* cited by examiner

*Primary Examiner* — Dirk Wright
(74) *Attorney, Agent, or Firm* — David B. Kelley; MacMillian, Sobanski & Todd, LLC

(57) ABSTRACT

A method for controlling restart of an engine in a hybrid electric powertrain includes stopping the vehicle and engine, initiating the restart, estimating time required to restart the engine after the restart is initiated, filling and stroking launch elements of a transmission, when the estimated time substantially equals a second estimated time required to fill and stroke said launch elements, and increasing the torque capacity of the launch elements to accelerate the vehicle.

19 Claims, 4 Drawing Sheets

TRANSMISSION CLUTCH STROKING CONTROL DURING AN ENGINE RESTART IN A HYBRID ELECTRIC VEHICLE

BACKGROUND OF THE INVENTION

1. Field of the Invention

This invention relates generally to a powertrain for a hybrid electric vehicle (HEV) and, more particularly, to control of a transmission friction control element during an engine restart event.

2. Description of the Prior Art

A hybrid electric vehicle (HEV) is a vehicle configured with a hybrid propulsion system that utilizes at least two different sources of torque for propelling the vehicle. As one non-limiting example, a hybrid propulsion system may combine a conventional propulsion system that includes an internal combustion engine and a stepped-ratio change automatic transmission with an electric propulsion system that includes one or more electric motors and a rechargeable energy storage device, such as a battery, that can power the electric motors or store energy to improve fuel economy over the conventional vehicle. A hybrid electric vehicle typically provides different powertrain operating modes with the engine running or shutdown depending on the vehicle operating conditions, battery conditions, and driver's propulsion request. Hence, one of the major functions that an HEV provides is the ability to start or stop the engine during certain conditions. When the engine is running, the electric portion of the propulsion system may be used to assist the engine in providing the required vehicle propulsion. During the conditions when the engine is shutdown, the driver's propulsion request can be provided entirely by the electric motor.

Motor vehicles can be designed to employ certain aspects of hybrid electric vehicle technology to reduce fuel consumption, but without use of a hybrid drivetrain. In such vehicles, called micro-HEVs, shutting down the engine during conditions where the engine operates at idle speed will be used to reduce fuel consumption in a conventional powertrain that includes an internal combustion engine and a stepped-ratio change automatic transmission, but no electric machine for driving the wheels. The primary condition that is checked by the micro-HEV powertrain control system before stopping the engine is that the driver has applied the brakes and the vehicle is stopped since the engine would typically be idling during these conditions in a conventional vehicle. Once the driver releases the brake pedal indicating a request for vehicle propulsion, the powertrain control system will automatically restart the engine.

In a micro-HEV application using an internal combustion engine with an enhanced starter motor for engine start/stop and an automatic transmission it is important to provide vehicle propulsion upon an engine restart in a responsive, consistent, and predictable manner. Delays due to transmission engagement and clutch torque capacity application will directly result in wheel torque delays and poor vehicle propulsion response.

Premature clutch torque capacity application can also lead to driveline torque oscillations and potential engine stall while restarting. In addition, poor vehicle performance will be sensed by the driver if the transmission engagement feel is too harsh during or after the engine restart. Temperature and other environmental conditions further amplify these issues.

If the engine is started while the transmission is fully engaged in gear, driveline excitation can occur as a result of engine start transients transmitting to the wheels. Furthermore, in automatic transmission applications with a torque converter, having the transmission geartrain fully engaged with the torque converter unlocked unnecessarily loads the engine while starting. An engine start strategy for which the transmission is fully engaged in gear requires auxiliary hydraulic line pressure during engine stops for electro-hydraulically operated automatic transmissions. This requires an auxiliary pump and results in energy consumption while the engine is off.

A powertrain control system for a micro-HEV powertrain must provide an immediate response to a request for vehicle propulsion when the engine is restarted. A strategy is needed to coordinate clutch filling during an engine start event while minimizing energy consumption in order to provide responsive, smooth, consistent and predictable vehicle propulsion performance.

SUMMARY OF THE INVENTION

A method for controlling the restart of an engine in a powertrain includes stopping the vehicle and engine, initiating the restart, estimating time required to restart the engine after the restart is initiated, stroking launch friction elements of a transmission when the estimated time substantially equals a second estimated time required to stroke said launch friction elements, and increasing the torque capacity of the launch friction elements to accelerate the vehicle. This invention is applicable, but not limited to conventional torque-converter automatic transmissions and dual-clutch transmissions.

The control strategy provides smooth driveline propulsion performance and minimal energy consumption during an engine restart, instead of using an in-gear approach during an engine restart. By predicting the time until the end of an engine start, the transmission clutch filling and stroking is initiated such that, by the completion of the engine start, the launch friction elements, such as clutches, will be fully stroked. Since the clutch filling and stroking time can change with operating and environmental conditions in addition to wear over time, the adaptive clutch filling information used by the shift execution controls can be used for clutch filling and stroking coordination during the engine start.

This ensures that premature clutch torque capacity application will not occur so that engine restarts can be performed smoothly without interaction and potential engine stall due to clutch torque loading. Furthermore, the operating time for relying on auxiliary hydraulic line pressure provided by an electric pump can be minimized, thus reducing energy consumption.

Optimum vehicle performance is provided consistently and predictably regardless of the vehicle operating conditions throughout the high frequency of engine starts in a micro-HEV.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
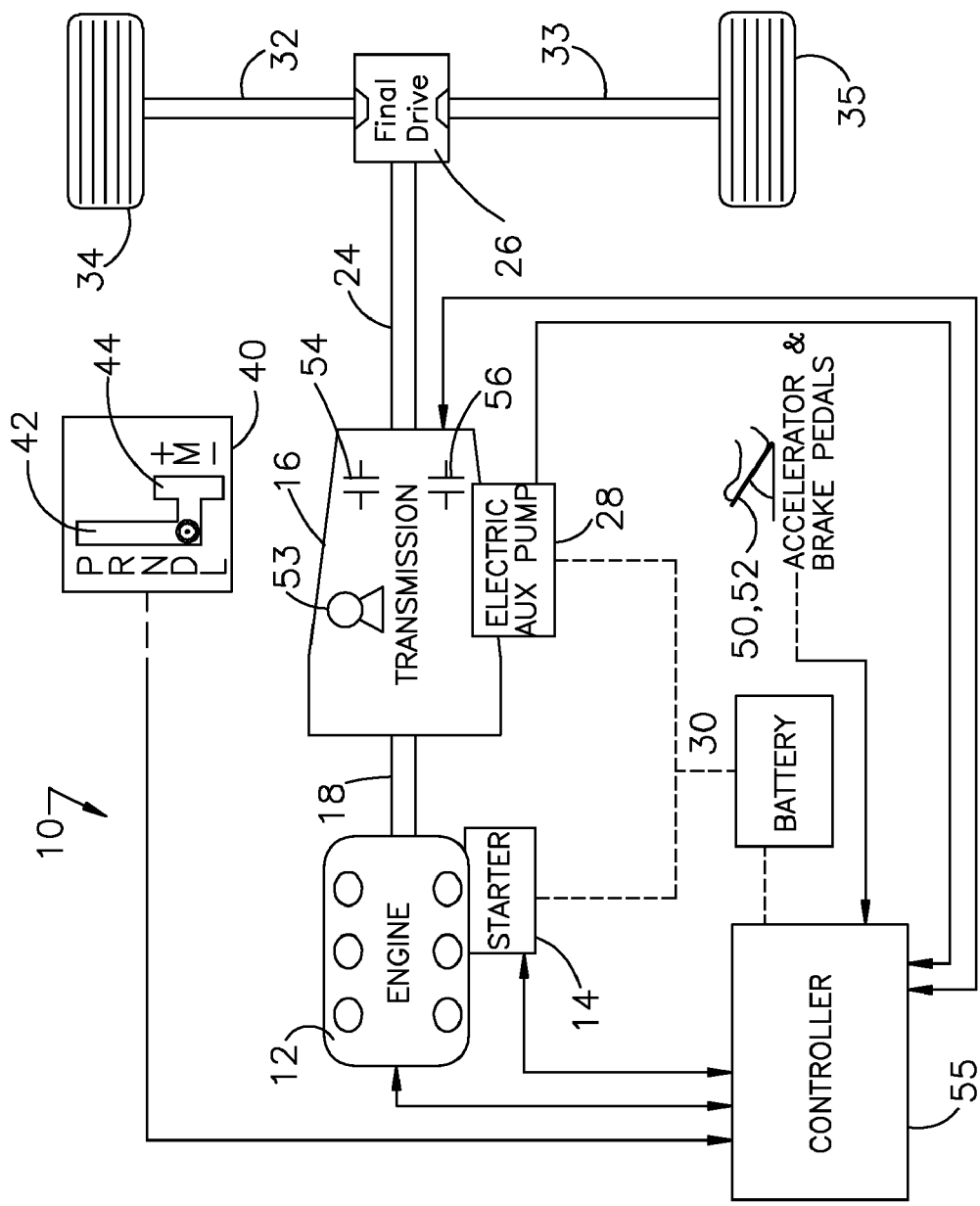
FIG. 1 is a schematic diagram of a micro-HEV powertrain.

Referring now to the drawings, the micro-HEV powertrain 10 of FIG. 1 includes a power source 12, such as an internal combustion engine; engine starter motor 14; automatic transmission 16; transmission input shaft 18; driveably connected to the engine 12; a transmission output 24; final drive mechanism 26, connected to the output; an electric auxiliary hydraulic pump (EAUX) 28, whose output pressurizes the hydraulic system of the transmission 16; an electric storage battery 30, which supplies electric power to the pump 28 starter 14 and a microprocessor-based controller 55; and axle shafts 32, 33, driveably connect to the driven wheels 34, 35 through the output and final drive mechanism.

A gear shifter 40 is moved manually by the vehicle operator among (P)ark, (R)everse, (N)eutral, and (D)rive range positions in an automatic mode channel 42 and between upshift (+) and downshift (-) positions in a manual mode channel 44.

Accelerator and brake pedals 50, 52, controlled manually by the vehicle operator, provide input demands to a control system for changes in engine wheel torque and changes in brake force, respectively.

Located within transmission 16 are friction control elements, i.e., clutches and brakes, whose state of coordinated engagement and disengagement produce the forward gears and reverse gear. The first forward gear, low gear, is produced when at least one, but preferably two of the control elements 54, 56 are engaged concurrently. The transmission friction control elements, whose engagement produces the desired gear in which the vehicle will be launched, are referred to as launch elements 54, 56. Hydraulic line pressure produced by the electric auxiliary pump 28 while the engine 12 is shutdown is used to fill and stroke the launch elements 54, 56, thereby preparing the transmission 16 for responsive torque transmission once the engine restart is completed. Stroking the launch control elements 54, 56 takes up clearances between the servo pistons and a pack of friction plates in the control elements, and clearances among the friction plates. The launch elements 54, 56 have substantially no torque transmitting capacity when stroke pressure is present in the servo cylinders that actuate the launch elements.

Transmission 16 also contains a hydraulic pump 53, such as a gerotor pump, whose output is used to produce pressure in the transmission's hydraulic circuit, through which the control elements 54, 56 are pressurized to a state of full engagement in coordination with the engine restart method.

A microprocessor-based controller 55, accessible to a restart control algorithm, communicates through electronic signals transmitted on a communication bus with the engine 12, starter 14, transmission 16, gear selector 40, auxiliary pump 28, gear shifter 40, and the accelerator and brake pedals 50, 52.

Figure 2:
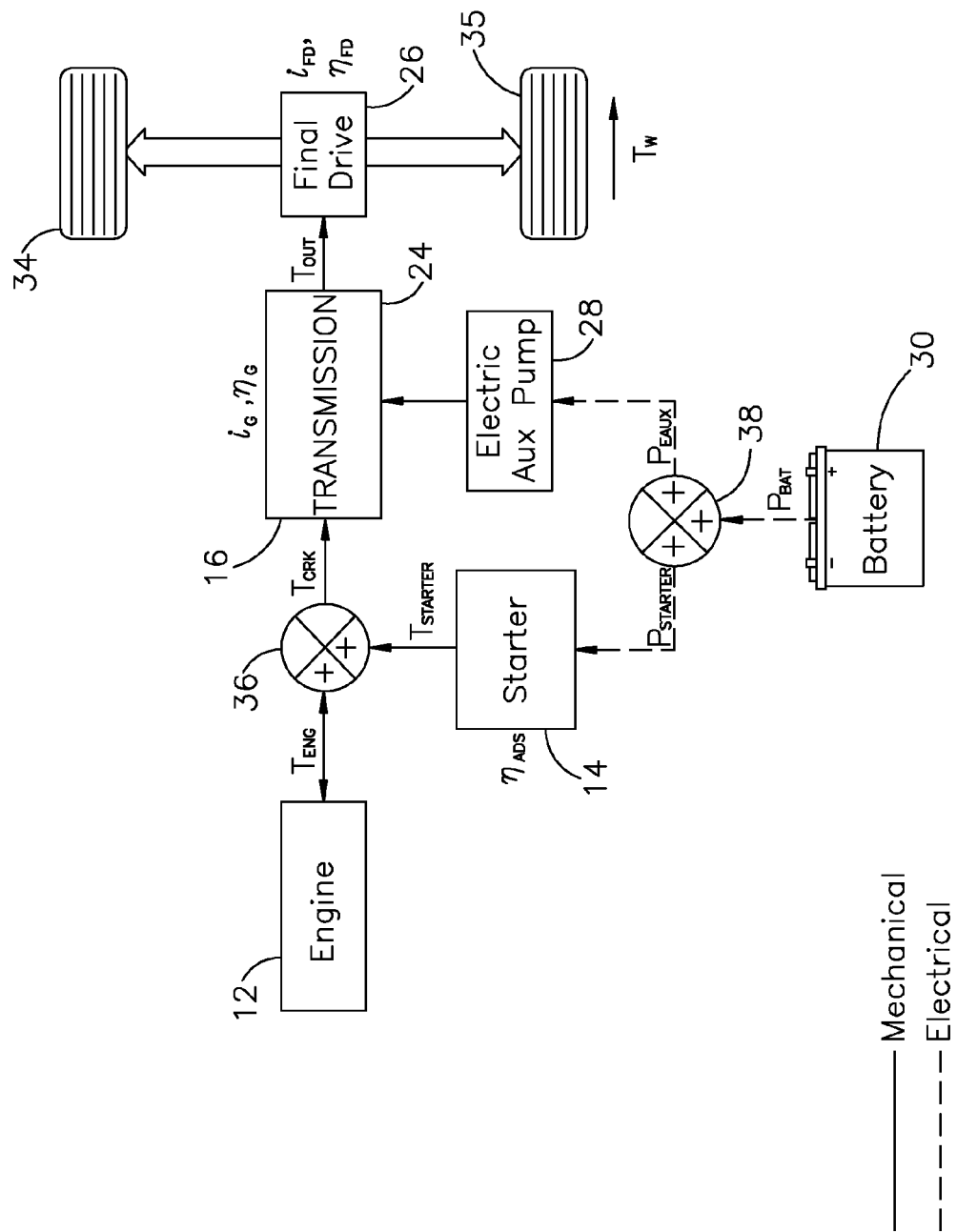
FIG. 2 is schematic diagram showing torque and electric power flow in the powertrain of FIG. 1.

FIG. 2 shows that engine output torque $T_{ENG}$, torque $T_{STARTER}$ produced by the starter motor 14 are combined at a junction 36 to produce engine cranking torque $T_{CRK}$. Transmission output torque TOUT is transmitted from the transmission 16 to the final drive 24, which includes an interwheel differential mechanism. Electric power from battery 30 $P_{BAT}$ is supplied to a junction 38, from which electric power $P_{EAUX}$ is distributed to the EAUX 28 and starter motor power $P_{STARTER}$ is distributed to the starter 14. Torque TOUT at the transmission output 24 is transmitted to the final drive and differential 26 which drive wheels 34, 35.

Figure 3B:
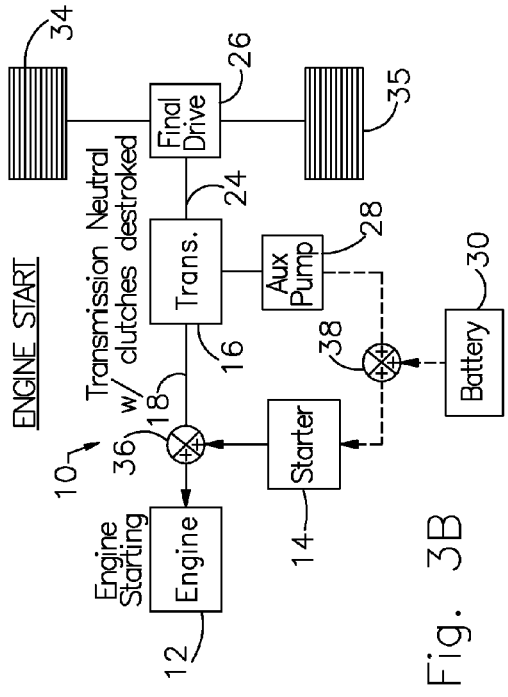
FIGS. 3A-3D are a schematic diagrams showing the operating modes used during an engine start event.
Figure 3C:
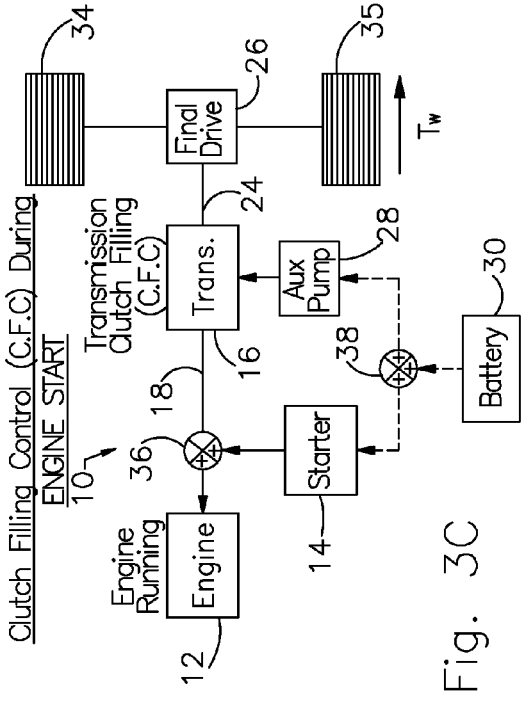
Figure 3A:
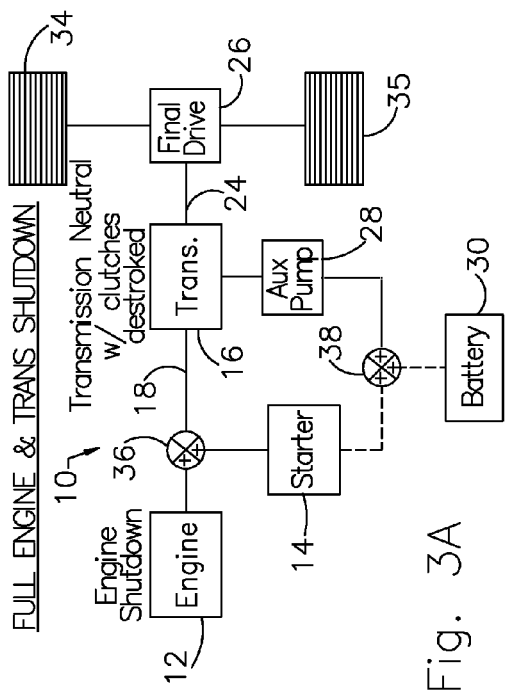

During the engine and transmission shut down mode illustrated in FIG. 3A, engine 12 is initially shutdown and transmission 16 is fully disengaged, i.e., the transmission is then disposed to produce no forward or reverse gear. Electric auxiliary pump 28 is not activated and does not provide and hydraulic pressure to transmission 16.

During the engine restart mode, illustrated in FIG. 3B, engine 12 is being cranked using torque $T_{STARTER}$ produced by the starter motor 14, while transmission 16 remains fully disengaged with the clutches destroked.

During the clutch filling control mode, illustrated in FIG. 3C, while engine 12 is restarting, filling of the launch elements 54, 56 is initiated as the estimated time at which sustained engine combustion occurs reaches the period required for the launch elements to become filled with pressurized hydraulic fluid. The launch elements 54, 56 are filled with fluid as electric auxiliary pump 28 provides hydraulic line pressure to the transmission 16 hydraulic circuit. The electric auxiliary pump 28 uses electric power $P_{EAUX}$ supplied by electric battery 30. During the clutch filling control mode, the launch elements 54, 56 do not have any torque capacity sufficient to produce vehicle propulsion, and engine 12 is being cranked using torque $T_{STARTER}$ produced by the starter motor 14.

Figure 3D:
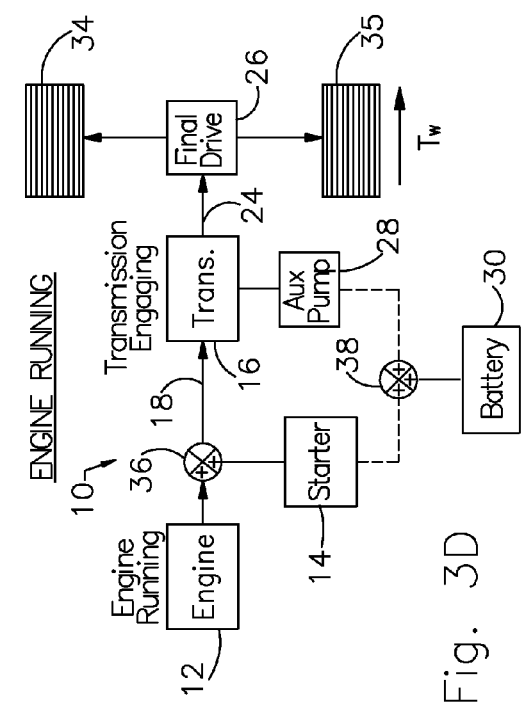

In order to provide vehicle propulsion after the engine 12 has sustained combustion and begins to run during the engine running mode, illustrated in FIG. 3D, closed-loop slip control of the launch elements 54, 56 is provided by modulating the torque capacity of the launch elements until slip across the launch elements is nearly zero. Thereafter, their torque capacity is increased in an open-loop manner until the transmission is fully engaged in the launch gear.

Figure 4:
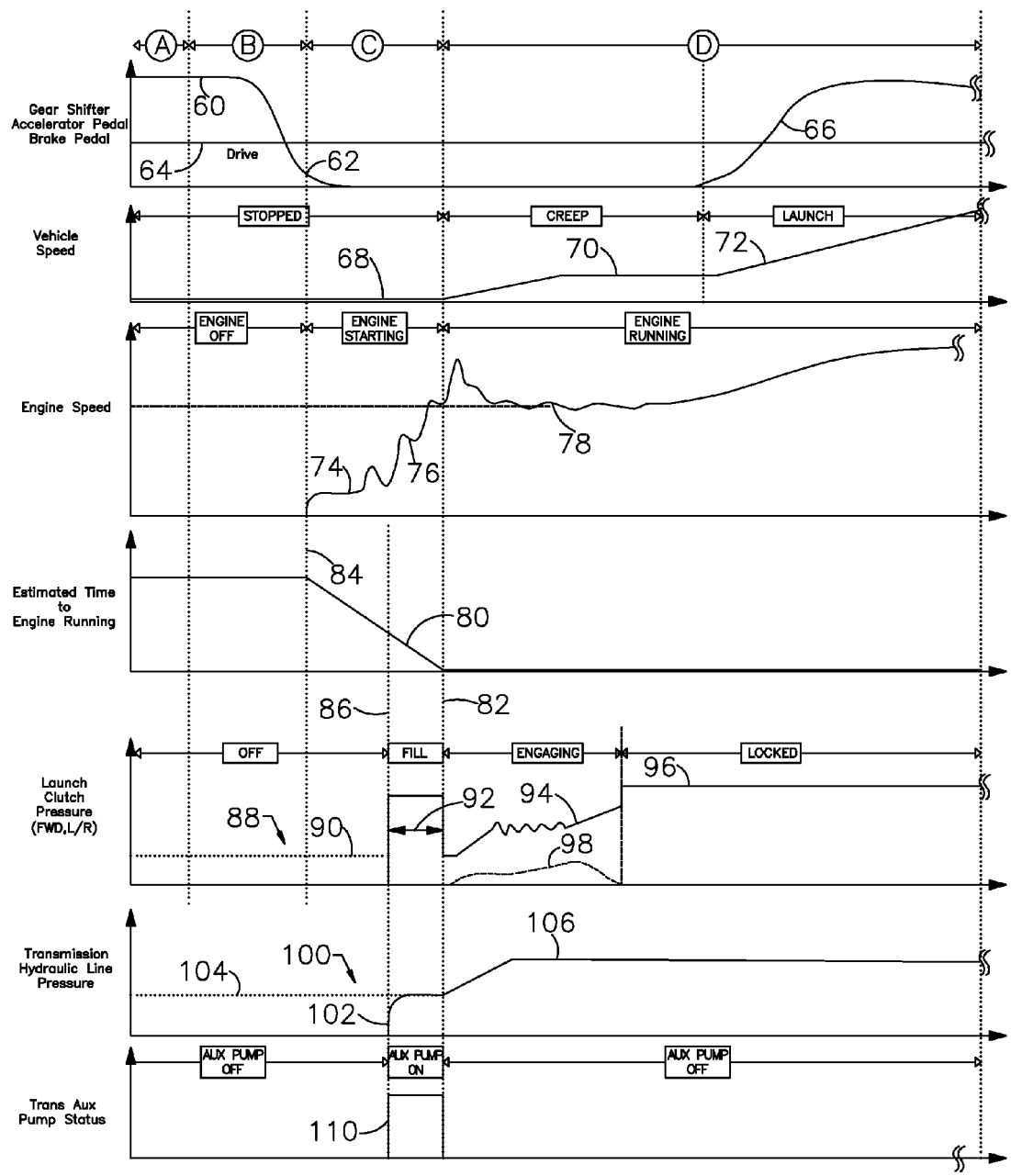
FIG. 4 are graphs that illustrate the change of powertrain variables during the coordinated filling of the launch elements during the engine restart event.

FIG. 4 contains graphs showing the change of certain powertrain variables and transmission launch clutch control during an engine restart event.

Graph 60 represents the initial release of brake pedal 52, and the distance through which the brake pedal is depressed while the vehicle and engine are stopped. The engine restart at 84 is initiated in response to release of the brake pedal 52 at 62.

Graph 64 represents position of the gear shift lever 40 which is in the (D)rive position in the automatic range during the entire event. Graph 66 represents the change of position of the accelerator pedal 50 following the engine restart at 84.

Graph 68, which represents vehicle speed, shows vehicle speed is zero before the engine restart, vehicle creep at 70 following the engine restart and vehicle launch acceleration 72 once the accelerator pedal 50 is depressed as shown on graph 66 once the engine is running.

Graph 74 represents engine speed while starter 14 cranks the engine 12, graph 76 represents engine speed while engine combustion occurs as the engine is starting, and graph 78 represents engine speed after the restart.

Graph 80 represents the estimated length of a time period before sustained engine combustion occurs at 82. Engine cranking begins at 84. Clutch fluid filling of the launch elements 54, 56 begins at 86, i.e., when the estimated length of the period before sustained engine combustion occurs is substantially equal to the period length required to fill the launch elements. Clutch filling initiated at 86 would begin earlier if the period to fill the launch elements is increased due to cold temperature or if the time to restart the engine 12 is shorter.

Graph 88, which represents hydraulic pressure in the launch friction elements 54, 56, shows a pressure increase greater than stroke pressure level 90 during the fill period 92, a decrease to stroke pressure 90, followed by a pressure increase while the launch elements are engaging at 94, and a further pressure increase 96 above holding pressure to lock the launch elements so that the transmission remains engaged in gear.

Graph 98 shows the variation of slip across the launch elements 54, 56.

Graph 100 shows that transmission hydraulic line pressure increases at 102 to pressure 104 provided by EAUX pump 28 during the launch element fill period 92. Thereafter, hydraulic line pressure increases due to engine 12 restarting and driving the pump 53 located in the transmission, to pressure 106, at which the transmission pump 53 provides the hydraulic pressure, and not the electric auxiliary pump 28.

Graph 110 represents the on-off status of the EAUX pump 28 At 86 when the clutch filling of launch elements 54,56 is initiated, the EAUX pump 28 is turned on and remains on during the engine start and is turned off after the engine is running at 82

In accordance with the provisions of the patent statutes, the preferred embodiment has been described. However, it should be noted that the alternate embodiments can be practiced otherwise than as specifically illustrated and described.

The invention claimed is:

1. A method for controlling restart of an engine in a hybrid electric powertrain, comprising the steps of:
   (a) stopping the vehicle and engine;
   (b) initiating the restart;
   (c) estimating time required to restart the engine after the restart is initiated;
   (d) filling and stroking launch elements of a transmission, when the estimated time substantially equals a second estimated time required to fill and stroke said launch elements;
   (e) increasing the torque capacity of the launch elements to accelerate the vehicle.

2. The method of claim 1 wherein step (a) further comprises stopping the vehicle and engine in response to depressing a brake pedal.

3. The method of claim 1 wherein step (a) further comprises stopping the vehicle and engine in response to releasing an accelerator pedal.

4. The method of claim 1 wherein step (b) further comprises initiating the restart in response to releasing the brake pedal.

5. The method of claim 1 wherein step (d) further comprises producing zero torque capacity in the launch elements.

6. The method of claim 1 wherein step (d) further comprises filling and stroking the launch elements that correspond to a gear in which the vehicle will be launched following the restart.

7. The method of claim 1 wherein:
   step (d) further comprises using an auxiliary pump to fill and stroke the launch elements; and
   the method further comprises discontinuing use of the auxiliary pump.

8. A method for controlling restart of an engine in a hybrid electric powertrain, comprising the steps of:
   (a) stopping the vehicle and engine;
   (b) initiating the restart using a starter to crank the engine;
   (c) estimating time required to restart the engine after the restart is initiated;
   (d) using an auxiliary pump to fill and stroke launch elements of a transmission when the estimated time substantially equals a second estimated time required to fill and stroke said launch elements;
   (e) using a hydraulic pump in the transmission to provide pressure that increases the torque capacity of the launch elements.

9. The method of claim 8 wherein step (a) further comprises stopping the vehicle and engine in response to depressing a brake pedal.

10. The method of claim 8 wherein step (a) further comprises stopping the vehicle and engine in response to releasing an accelerator pedal.

11. The method of claim 8 wherein step (b) further comprises initiating the restart in response to releasing the brake pedal.

12. The method of claim 8 wherein step (d) further comprises producing zero torque capacity in the launch elements.

13. The method of claim 8 wherein step (d) further comprises stroking the launch elements that correspond to a gear in which the vehicle will be launched following the restart.

14. A hybrid electric powertrain, comprising:
   an engine;
   a transmission including launch elements and a hydraulic circuit;
   a source of electric power;
   an auxiliary pump driven from the power source and connected to the hydraulic circuit;
   a starter driven from the power source and connected to the engine; and
   a controller configured to stop the engine, use the starter to initiate a restart of the engine, estimate time required to complete the restart after initiating the restart, use the auxiliary pump to stroke launch elements of a transmission when the estimated time substantially equals a second estimated time required to compete the stroking of the launch elements, and increase a torque capacity of the launch elements to accelerate the vehicle.

15. The powertrain of claim 14 wherein the controller is further configured to electrically disconnect the power source from the auxiliary pump.

16. The powertrain of claim 14 wherein the controller is further configured to stop the vehicle and engine in response to a depression of a brake pedal.

17. The powertrain of claim 14 wherein the controller is further configured to stop the vehicle and engine in response to releasing a brake pedal.

18. The powertrain of claim 14 wherein the controller is further configured to stroke the launch elements that correspond to a gear in which the vehicle will be launched following the restart.

19. The powertrain of claim 14 wherein the controller is further configured to estimate time required to complete the engine restart after initiating the restart based on the engine speed and engine speed acceleration.

* * * * *